United States Patent [19]

Bopp et al.

[11] Patent Number: 5,147,710

[45] Date of Patent: Sep. 15, 1992

[54] FLAME RETARDANT LOW DENSITY FOAM ARTICLES

[75] Inventors: Richard C. Bopp, West Coxsackie, N.Y.; Richard D. Lassor, Danville, Calif.

[73] Assignee: General Electric Company, Selkirk, N.Y.

[21] Appl. No.: 427,754

[22] Filed: Oct. 27, 1989

[51] Int. Cl.$^5$ .................................. B32B 3/26
[52] U.S. Cl. .................. 428/213; 428/304.4; 428/317.1; 428/319.1; 428/921
[58] Field of Search .............. 428/304.4, 316.6, 319.1, 428/319.3, 319.7, 319.9, 921, 213, 317.1

[56] References Cited

U.S. PATENT DOCUMENTS

| | | | |
|---|---|---|---|
| 3,151,192 | 9/1964 | Jacobs et al. | 264/53 |
| 3,431,164 | 3/1969 | Gilbert | 428/71 |
| 3,686,067 | 8/1972 | Williams | 428/319.7 |
| 4,122,203 | 10/1978 | Stahl | 428/921 |
| 4,169,915 | 10/1979 | Heitmann | 428/921 |
| 4,223,066 | 9/1980 | Boyle | 428/921 |
| 4,254,177 | 3/1981 | Fulmer | 428/921 |
| 4,265,963 | 5/1981 | Matalon | 428/921 |
| 4,366,203 | 12/1982 | Briggs | 428/304.4 |
| 4,366,204 | 12/1982 | Briggs | 428/304.4 |
| 4,454,087 | 6/1984 | Hayashi et al. | 264/53 |
| 4,507,338 | 3/1985 | Freudlich | 428/319.7 |
| 4,579,710 | 4/1986 | Krutchen et al. | 264/321 |
| 4,579,873 | 4/1986 | Kurtchen et al. | 521/60 |
| 4,579,874 | 4/1986 | Krutchen et al. | 521/79 |
| 4,579,878 | 4/1986 | Krutchen et al. | 521/180 |
| 4,587,271 | 5/1986 | Krutchen et al. | 521/60 |
| 4,594,208 | 6/1986 | Krutchen et al. | 264/53 |
| 4,598,100 | 7/1986 | Krutchen et al. | 521/81 |
| 4,598,101 | 7/1986 | Krutchen et al. | 521/81 |
| 4,598,104 | 7/1986 | Krutchen et al. | 521/139 |
| 4,661,302 | 4/1987 | Park | 264/53 |
| 4,705,811 | 11/1987 | Park | 521/88 |
| 4,734,441 | 3/1988 | Park | 521/139 |
| 4,826,723 | 5/1989 | Brambach | 428/284 |
| 4,889,763 | 12/1989 | Brambach | 428/473.5 |

FOREIGN PATENT DOCUMENTS 1203461 8/1970 United Kingdom .
1479292 7/1977 United Kingdom .

*Primary Examiner*—William J. Van Balen
*Attorney, Agent, or Firm*—Hedman, Gibson & Costigan

[57] ABSTRACT

Flame resistant low density foam articles are provided. The foam article is preferably a foam board or a molded expandable foam bead comprised of a thermoplastic resin having adhered thereto a flame-resistance-conferring material serving as a surface flame-resistant barrier in the nature of a thermoplastic or thermosetting coating or laminate or in the nature of a foil, such as aluminum foil.

18 Claims, No Drawings

FLAME RETARDANT LOW DENSITY FOAM ARTICLES

FIELD OF THE INVENTION

The present invention relates to flame resistant, preferably flame retardant, low density foam articles In the art, such foam articles can be made by, inter alia, extrusion or can be a "bead board" made from expandable foam beads. In additional preferred embodiments, the low density foam articles are foam boards which are useful in the construction industry.

BACKGROUND OF THE INVENTION

Foam extrusion technology is well-known in the art. Traditional expanded polystyrene technology has existed since the early 1950's, and is discussed, for example, in U.S. Pat. Nos. 3,151,192 and 3,431,164. Uses for low density foam extrusions include foam insulation and food packaging.

Although many foamed articles comprising engineering thermoplastics such as polycarbonates, polyesters, polyamides, polyolefins, polyphenylene ethers, as well as compositions of the foregoing with other thermoplastics such as polystyrenes, are known, it is not generally a part of the foam extrusion art to produce flame retardant structures from them.

For example, in U.S. Pat. No. 4,454,087, foamable compositions are described which may be comprised of styrene, polyethylene, polypropylene, polycaprolactam and the like. There is no apparent mention of the use of flame retardants in the compositions or of the flame retardant characteristics of the articles themselves.

In U.S. Pat. Nos. 4,661,302; 4,705,811 and 4,734,441 processes and compositions relating to foamable polystyrene resins, which may include a polyphenylene ether expansion aid and/or a phosphate plasticizer, are described. Again, there is no apparent mention of the use of any specific flame retardants in the compositions or of the flame retardant characteristics of the articles themselves.

In U.S. Pat. Nos. 4,579,710; 4,579,873; 4,579,874; 4,579,878; 4,587,271; 4,594,208; 4,598,100; 4,598,101 and 4,598,104, there are described foamable thermoplastic compositions which may be comprised of resins selected from the group consisting of solvent imbibable polyetherimide, polycarbonate and polyphenylene ether resin in combination with polystyrene resin. The foamed compositions are described as having a density of less than about 20 lbs./cu.ft. Although the patentees in these disclosures mention that the resulting foam compositions are inherently flame resistant and low in smoke generation, the only exemplified composition exhibiting any flame resistance is of a polyetherimide, which is inherently flame retardant.

Finally, in British Patent No. 1,479,292, compositions are described which are comprised of a minor amount of a foaming agent in conjunction with a thermoplastic resin. The thermoplastic resin can be selected from the group consisting of an aromatic polycarbonate, a polyester, and a polyphenylene ether or a mixture thereof with a styrene resin. The patent mentions that pellets produced from the described compositions are directly moldable to produce a structural foam article. The patent also mentions that the described foamable compositions may contain conventional flame retardants, such as, for example, halogenated compounds or compounds containing phosphorous and/or nitrogen. No flame retardant compositions, or even compositions containing a flame retardant, are exemplified.

A need therefore, continues to exist to produce low density foam articles from thermoplastics which are flame retardant. Methods to make the same, and the foamed articles themselves, have now been discovered and are the subject matter of this invention.

It is therefore an object of the present invention to provide flame resistant, preferably flame retardant, low density extruded foam articles or articles molded from expandable foam beads.

In particular, it is an object of the present invention to provide low density foam insulation, preferably in the nature of foam boards, for the building and construction industry which have satisfactory flame spread and smoke development characteristics according to Steiner Tunnel (ASTM E-84) Flammability Tests.

SUMMARY OF THE INVENTION

According to this invention there are provided flame resistant, low density structural articles comprising:

(a) a foam substrate comprised of thermoplastic resin; and (b) a flame-resistance-conferring material adhered to the substrate surface.

The term thermoplastic resin includes those resins known to those skilled in the art, and includes resins with superior properties, especially mechanical strength and toughness also known as engineering thermoplastic resins, and typically embraces homopolymers or copolymers of polyphenylene ethers, aromatic polycarbonates, polyesters, polyamides, polyarylates, polyetherimides, polysulfones, polyolefins, combinations of more than one of the foregoing, and combinations of any one or more of the foregoing with an alkenyl aromatic The term "foam substrate" includes both extruded foam articles and articles molded from expandable foam beads.

The polyphenylene ether (PPE) resin is normally a homopolymer or copolymer having units of the formula

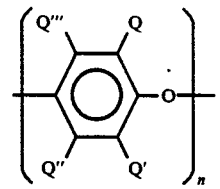

wherein Q, Q', Q", and Q''' are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least 50.

The polyphenylene ether resin can be prepared in accordance with known procedures, such as those described in U.S. Pat. Nos. 3,306,874 and 3,306,875, from the reaction of phenols including but not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-tolylphenol; 2-methoxyphenol; 2,3,6-trimethylphenol; 2,3,5,6-tetramethylphenol, 2,3,5,6-tetraethylphenol and 2,6-diethoxyphenol.

Each of these may be reacted alone to produce the corresponding homopolymer, or in pairs or with still other phenols to produce the corresponding copolymer.

Examples of the homopolymers include:
poly(2,6-dimethyl-1,4-phenylene ether),
poly(2,6-diethyl-1,4-phenylene ether),
poly(2,6-dibutyl-1,4-phenylene ether),
poly(2,6-dilauryl-1,4-phenylene ether),
poly(2,6-dipropyl-1,4-phenylene ether),
poly(2,6-diphenyl-1,4-phenylene ether),
poly(2-methyl-6-tolyl-1,4-phenylene ether),
poly(2-methyl-6-methoxy-1,4-phenylene ether),
poly(2-methyl-6-butyl-1,4-phenylene ether),
poly(2,6-dimethoxy-1,4-phenylene ether),
poly(2,3,6-trimethyl-1,4-phenylene ether),
poly(2,3,5,6-tetramethyl-1,4-phenylene ether),
poly(2,3,5,6-tetraethyl-1,4-phenylene ether), and
poly(2,6-diethoxy-1,4-phenylene ether).

Examples of the copolymers include especially those of 2,6-dimethylphenol with other phenols, such as poly(2,6-dimethyl-co-2,3,6-trimethyl-1,4-phenylene ether) and poly(2,6-dimethyl-co-2-methyl-6-butyl-1,4-phenylene ether).

For purposes of the present invention, an especially preferred family of polyphenylene ethers includes those having alkyl substitution in the two positions ortho to the oxygen ether atom, i.e., those of the above formula where Q and Q' are alkyl, most preferably having from 1 to 4 carbon atoms. Illustrative members of this class are:
poly(2,6-dimethyl-1,4-phenylene) ether;
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether;
poly(2-ethyl-6-propyl-1,4-phenylene)ether; and the like.

The most preferred polyphenylene ether resin for purposes of the present invention is poly(2,6-dimethyl-1, 4-phenylene)ether.

Low density foams comprised of polyphenylene ether or its copolymers as the primary high polymer component blended with low molecular weight additives, such as triaryl phosphates, fatty amides, plasticizers, brominated BPA derivatives, brominated diphenyl ethers, oligomeric styrenics and hydrogenated derivatives thereof, or esters are also included within the scope of this invention.

The engineering thermoplastic polyphenylene ether resin can be used alone or in combination with an alkenyl aromatic polymer. The term "alkenyl aromatic polymer" as it is employed in this disclosure is intended to encompass homopolymers as well as copolymers and terpolymers of alkenyl aromatic compounds with one or more other materials. Preferably, the alkenyl aromatic polymer is based at least in part on units of the formula

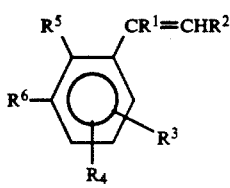

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen, and lower alkyl of from 1 to 6 carbon atoms; $R^5$ and $R^6$ are selected from the group consisting of hydrogen and lower alkyl and alkenyl aromatic groups of from 1 to 6 carbon atoms; or $R^5$ and $R^6$ may be concatenated together with hydrocarbyl groups to form a naphthyl group.

The above will encompass styrene, as well as homologs and analogs of styrene. Specific examples include, in addition to styrene, chlorostyrene, bromostyrene, alpha-methyl styrene, para-methyl styrene, vinyl styrene, divinyl-benzene and vinyl naphthalene. Substantially atactic styrene is especially preferred.

Polyphenylene ether resins and polystyrene resins are combinable in all proportions, e.g., from about 1 to 99 to about 99 to about 1 parts by weight. It is contemplated, however, that low density compositions of the present invention are comprised of at least 2 weight percent PPE (based upon the weight of PPE and PS taken together). Compositions containing less than 2 weight percent PPE are considered to be primarily polystyrene compositions and do not generally exhibit the preferred property improvements associated with PPE/PS blends. It is well-known that the addition of PPE to polystyrene blends offers improvements in impact strength, flammability ratings, tensile strength and other mechanical properties. Conversely, polystyrene is typically blended with polyphenylene ether resins to offer better processability for many thermoplastic processes.

Typical PPE/PS blends useful in the practice of the present invention will be comprised of between 10 to 90 percent, and preferably 20 to 80 percent by weight PPE and 90 to 10 percent, preferably 80 to 20 percent by weight PS based upon the weight of the two resins taken together. It is contemplated, however, that the present invention may be practiced for resin systems having up to one hundred percent PPE resin thereby providing low density PPE articles according to the present invention which were not heretofore available.

The polyphenylene ether resin, with or without the alkenyl aromatic resin may further comprise a flame retardant agent. Such flame retardant agents are well-known in the art and, in general, may be selected from the group consisting of halogen-containing (e.g., chlorine-and/or bromine-containing), phosphorous-containing (e.g., organophosphate compounds), nitrogen-containing compounds (e.g. melamine) and fluoropolymers, e.g. PTFE. The flame retardant agent may be used alone or in combination with a flame retardant synergist such as an antimony compound (e.g., antimony trioxide), a molybdenum compound, hydrated alumina, and the like.

The aromatic polycarbonates can be polymers of dihydric phenols and carbonate precursors. The dihydric phenols that can be employed are bisphenols such as bis(4-hydroxyphenol) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2,2-bis(4-hydroxy-3,5-dichlorophenyl) propane and 2,2-bis(4-hydroxy-3,5-dibromophenyl) propane; dihydric phenol ethers such as bis(4-hydroxyphenyl) ether, bis(3,5-dichloro-4-hydroxyphenyl) ether, etc.; dihydroxydiphenols such as p,p'-dihydroxydiphenyl, 3,3'-dichloro-4,4'-dihydroxydiphenyl; dihydroxyaryl sulfones such as bis(4- hydroxyphenyl) sulfone, bis(3,5-dimethyl-4-hydroxyphenyl) sulfone; dihydroxy benzenes such as resorcinol and hydroquinone; halo- and alkyl-substituted dihydroxy benzenes such as 1,4-dihydroxy-2,5-dichlorobenzene, 1,4-dihydroxy-3-methylbenzene, etc.; and dihydroxy diphenyl sulfoxides such as bis(4-hydroxyphenyl) sulfoxide and bis(4-hydroxyphenol) sulfoxide and bis(3,5-dibromo-4-hydroxyphenol) sulfoxide. A variety of additional dihydric phenols are also available to provide carbonate polymers and are disclosed in U.S. Pat. Nos. 2,999,835; 3,028,365 and 3,153,008.

Also suitable for preparing the aromatic carbonate polymers are copolymers prepared from any of the above which have been copolymerized with halogen-containing dihydric phenols such as 2,2-bis(3,5-dichloro-4-hydroxyphenyl) propane, 2,2-bis(3,5-dibromo-4-hydroxyphenol) propane. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate; di-(halophenyl) carbonates such as di-(chlorophenyl) carbonate, di-(bromophenyl) carbonate, di-(trichlorophenyl) carbonate, di-(chloronaphthyl) carbonate, and di-(tribromophenyl) carbonate; di-(alkylphenyl) carbonates such as di-(tolyl) carbonate, di-(naphthyl) carbonate, phenyl tolyl carbonate and chlorophenylchloronaphthyl carbonate, or mixtures thereof. The haloformates suitable for use herein include bis-haloformates of dihydric phenols (bischloroformates of hydroquinone) or glycols (bis-haloformates of ethylene glycol, neopentyl glycol, or polyethylene glycol). While other carbonate precursors will occur to those skilled in the art, carbonyl chloride, also known as phosgene, is preferred. The polycarbonates are prepared by methods well-known to those skilled in the art.

The polyesters include linear saturated condensation products of diols and dicarboxylic acids, or reactive derivatives thereof. Preferably, they will comprise condensation products of aromatic dicarboxylic acids or esters and aliphatic diols. It is to be understood that it is also possible to use polyesters such as poly(1,4-dimethylolcyclohexane dicarboxylates, e.g., terephthalates). In addition to phthalates, small amounts, e.g., from 0.5 to 15% by weight, of other aromatic dicarboxylic acids, such as naphthalene dicarboxylic acid, or aliphatic dicarboxylic acids, such as adipic acid, can also be present in the compositions. The diol constituent can likewise be varied in the preferred embodiments, by adding small amounts of cycloaliphatic diols. In any event, the preferred polyesters are well-known as film and fiber formers, and they are provided by methods outlined in U.S. Pat. No. 2,465,319 and U.S. Pat. No. 3,047,539 and elsewhere. The preferred polyesters will comprise a poly(alkylene terephthalate, isophthalate or mixed isophthalate-terephthalate, e.g., up to 30 mole % isophthalate), said alkylene groups containing from 2 to 10 carbon atoms, e.g., poly(ethylene terephthalate) or poly(1,4-butylene terephthalate).

Also included are poly(butylene terephthalate) co-polyester resins.

Among the units which can be present in the poly(butylene terephthalate) copolyester resins are: aliphatic dicarboxylic acids, e.g., of up to 50 carbon atoms, including cycloaliphatic, straight and branched chain, acids, such as adipic acid, cyclohexanediacetic acid, dimerized $C_{16}$–$C_{18}$ unsaturated acids (which have 32 to 36 carbon atoms), trimerized such acids, and the like. Among the units in the copolyesters can also be minor amounts derived from aromatic dicarboxylic acids, e.g., of up to 36 carbon atoms, such as isophthalic acid. In addition to the 1,4-butylene glycol units, there can also be minor amounts of units derived from other aliphatic glycols and polyols, e.g., of up to 50 carbon atoms, including ethylene glycol, propylene glycol, glycerol and cyclohexanediol. Such copolyesters can be made by techniques well-known to those skilled in the art.

The polyamide resins useful in the practice of the present invention are a generic family of resins known as nylons, characterized by the presence of an amide group (—CONH—) Nylon-6 and nylon-6,6 are the generally preferred polyamides and are available from a variety of commercial sources. Other polyamides, however, such as nylon-4, nylon-12, nylon-6,10, nylon-6,9, or others such as the amorphous nylons may be useful for particular applications.

The polyolefin resin useful in the practice of the present invention includes polyethylene, polypropylene, polyisobutylene, copolymers of ethylene and propylene, as well as copolymers of ethylene and organic esters such as ethylene vinyl acetate, ethylene ethyl acetate, ethylene methylacrylate, and the like. These are commercially available or are otherwise prepared from known teachings.

The foam substrate, component (a) of the present invention, is preferably comprised of a foam board having a density of less than about 20 pounds per cubic foot, more preferably having a density of less than about 10 pounds per cubic foot, especially preferably having a density of less than about 5 pounds per cubic foot, and most especially preferably having a density of about 1 to 5 pounds per cubic foot. The manufacture of foamed substrates and articles having such densities are well-known to those skilled in the art, and may be, for example, extruded foam articles or articles molded from expandable foam beads.

The flame-resistance-conferring material, component (b) of the present invention, which is adhered to the foamed substrate may be thermoplastic or thermosetting in nature, but, in any event, must be adhered to the foamed substrate and be present in a sufficient thickness so as to render the articles of the invention flame resistant, preferably flame retardant and/or, in additional preferred embodiments, should be present in an amount sufficient to produce an efficacious amount of char in the Steiner Tunnel test.

Examples of thermoplastic flame-resistance-conferring materials include, but are not limited to, polyetherimide (a preferred polyetherimide resin is available from General Electric Company under the trade designation Ultem ®), halogenated aromatic polycarbonates, such as chloral-BPA polycarbonate and copolymers of BPA-polycarbonate and halogenated aromatic polycarbonates with polysiloxanes, polysulfones, polyamides, polytetrafluoroethylene and fluoropolymers, polyvinylidene chloride/fluoride, flame retardant polyphenylene ether and blends and mixtures of the foregoing.

Examples of thermoset flame-resistance-conferring materials include cross-linked derivatives of the aforementioned thermoplastics as well as Nomex ®, urethane resins, phenol formaldehyde resins, cross-linked silicones and melamine-formaldehyde resins.

It may be desirable to modify these materials with certain additives, including flame retardants/synergists, processing aids, intumescent agents, adhesion promoters and fillers, including reinforcing fillers such as fibers, platelets or flakes made from glass, carbon, mineral or metal.

The flame-resistance-conferring material adhered to the substrate may also be in the nature of a foil or a fiberglass mat. Preferably, the foil is a metal foil which is preferably, aluminum foil. Also, contemplated as a suitable foil are paper-backed, perforated aluminum foils. A 40 lb., kraft paper-backed, perforated 0.2 mil aluminum foil has been found to be satisfactory in this regard. The fiberglass mat may be woven or non-woven and may, preferably, contain a filler such as exfoliated vermiculite.

The flame-resistance-conferring material, as mentioned above, should be present in an amount sufficient to render the articles of the invention flame resistant, preferably flame retardant, and/or in additional preferred embodiments, should be present in an amount to produce sufficient char so as to form a composite having satisfactory flame spread and smoke development characteristics. In general, the thickness of the flame-resistance-conferring material may range up to about 150 mils or more, preferably up to about 50 mils, more preferably up to about 20 mils, especially preferably from about 1 to about 20 mils, and most especially preferably from about 1 to about 5 mils.

As mentioned above, the flame-resistance-conferring material must be adhered to the substrate.

When the flame-resistance-conferring material is in the nature of a thermoplastic resin, it may be adhered, inter alia, by lamination (such as by application of pressure or through the use of an appropriate adhesive) of a thin film, by melt coating or by application from solution (such as by spraying or dipping).

When the flame-resistance-conferring material is in the nature of a thermoset resin, it may be adhered, inter alia, by methods above-mentioned for thermoplastic resins which are employable for such thermoset resins, as well as through cross-linking to the surface of the substrate by methods known to those skilled in the art.

When the flame-resistance-conferring material is in the nature of a metal foil or non-woven glass fiber/vermiculite mat, lamination or physical attachment of the foil or mat, as above-mentioned, is suitable. Coupling and/or sizing agents, as are known in the art, may be utilized to effect or improve adherence of the foil or mat to the substrate.

In all cases, other means of physical attachment, e.g. through the use of staples, tacks and the like may be employed.

When the substrate is in the nature of a foam board, the flame-resistance-conferring material may be adhered to one or more of the large surface areas of the board. For example, when the foam board is in the shape of a building panel such as a standard 4'×8' panel, the flame-resistance-conferring material may be adhered to one or both of the 4'×8' surface areas thereof, depending upon the efficacy of the flame-resistance-conferring material to retard flame spread and/or smoke development, the degree of flame and smoke retardancy desired,. as well as the ease of application of the flame-resistance-conferring material. More than one flame-resistance-conferring material per substrate, and/or per surface, can be used.

The Steiner Tunnel tests referred to herein comprise the following ratings:

| Steiner Tunnel (ASTM E-84) Flammability Ratings | | |
|---|---|---|
| Class | Flame Spread Range | Smoke Development Number |
| A | 0 to 25 | <450 |
| B | 26 to 75 | <450 |
| C | 76 to 200 | <450 |

The following examples serve to illustrate applicants' invention and are not to be construed as a limitation thereon.

EXAMPLE I

Steiner Tunnel tests carried out at the Hardwood Plywood Manufacturers Association (HPMA) laboratory in Reston, Va. have shown that non-flame-retarded foams comprised of polyphenylene ether/alkenyl aromatic resin blends and containing up to 40% polyphenylene ether fail (do not attain a "C" rating) E-84 specifications for flame spread and smoke development. Low density flame retardant foam boards comprised of polyphenylene ether/alkenyl aromatic resin blends, and containing triaryl phosphates or brominated polystyrene were found to exhibit Class C flame spread behavior and widely varying smoke generation, sometimes exceeding the maximum allowable value of 450. Improved Class B flame spread and low smoke development was achieved with a non-flame retardant foam board comprised of polyphenylene ether/alkenyl aromatic resin blend (25% PPE/75% PS) clad with a variety of flame barriers, including aluminum foil (3 mil) and a non-woven glass fiber/vermiculite mat.

EXAMPLE II

Mini-Steiner tunnel testing (ASTM D-3806) results for foam boards comprised of polyphenylene ether/bromine-containing alkenyl aromatic resin blend (25PPE/75 PS with 5% Br) at ¼" thickness show that the best flame spread and smoke development values are obtained with a solid 2 mil aluminum foil coating. Still very substantial improvement in both properties is found with a paper-backed perforated aluminum foil coating. The foam boards in the following had a density of about 2.6 pounds per cubic foot.

| MINI-STEINER FLAMMABILITY TEST RESULTS | | | |
|---|---|---|---|
| | Flame Spread | Smoke Development | Weight % Consumed |
| Uncoated Control | 78.9 | 77% | 21.1 |
| Foam board with adhesive only | 73.1 | 54% | 19.6 |
| Foam board w/0.2 mil perforated aluminum foil (paper backed) | 49.9 | 15% | 20.2 |
| Foil board w/2 mil aluminum foil | 30.2 | 4% | 14.6 |

All of the patents and publications above-mentioned are incorporated herein by reference.

The foregoing description will suggest many obvious variations of this invention to those skilled in the art.

I claim:

1. A low density, fire-resistant, structural composite comprised of:
   (a) a foam substrate comprised of thermoplastic resin; and
   (b) a flame-resistance-conferring material adhered to the substrate, wherein the foam substrate is comprised of a polyphenylene ether resin and the flame-resistance-conferring material is comprised of aluminum foil and is present on the substrate surface in a thickness of about 0.1 to about 5 mils.

2. A composite as defined in claim 1, wherein the foam substrate further comprises an alkenyl aromatic polymer which is a homopolymer or copolymer comprised primarily of styrene and substituted styrene units.

3. A composite as defined i claim 2, wherein the foam substrate is comprised of about 10 to 90 parts by weight alkenyl aromatic resin per 100 parts by weight of the combination of polyphenylene ether and alkenyl aromatic resin.

4. A composite as defined in claim 1, wherein the polyphenylene ether resin is selected from the group consisting of poly(2,6-dimethyl-1,4-phenylene ether) and poly(2,3,6-trimethyl-1,4-phenylene ether).

5. A composite as defined in claim 1, wherein the polyphenylene ether resin comprises poly(2,6-dimethylco -2,3,6-trimethyl-1,4-phenylene ether).

6. A composite as defined in claim 1, wherein said polyphenylene ether resin is a homopolymer or copolymer or blend comprised primarily of 2,6-dimethyl phenylene ether units and 2,3,6-trimethyl phenylene ether units and has an intrinsic viscosity of about 0.1 to 0.7 dl/gm as measured in chloroform at 25° C.

7. A composite as defined in claim 2, wherein the alkenyl aromatic resin comprised of substantially atactic polystyrene.

8. A composite as defined in claim 1, wherein said polyphenylene ether resin composition further comprises a flame retardant agent.

9. A composite as defined in claim 8, wherein the flame retardant is selected from the group consisting of a nitrogen-containing compound, a fluoro polymer, an organophosphate compound, a brominated aromatic compound alone or combined with an antimony synergist, hydrated alumina, and mixtures of any of the foregoing.

10. A composite as defined in claim 1, wherein the aluminum foil is comprised of a paper-backed, perforated aluminum foil.

11. A composite as defined in claim 1, wherein the foam substrate has a density of less than about 20 lb./cu-ft.

12. A composite as defined in claim 1, wherein the foam substrate has a density of less than about 10 pounds per cubic foot.

13. A composite as defined in claim 1, wherein the foam substrate has a density of less than about 5 lb./cu-ft.

14. A composite as defined in claim 1, wherein the foam substrate has a density of from about 1 to about 5 lb./cu-ft.

15. A composite as defined in claim 1, wherein the flame-resistance-conferring material is present on the substrate surface in a thickness of from about 1 to about 5 mils.

16. A composite as defined in claim 1, wherein component (b) is the only flame-resistance-conferring component present in the composite.

17. A low density, fire-resistant, structural composite comprised of:
   (a) a foam substrate comprised of thermoplastic resin; and
   (b) a flame-resistance-conferring material adhered to the substrate, wherein the foam substrate is comprised of a polyphenylene ether resin and the flame-resistance-conferring material is comprised of aluminum foil and is present on the substrate surface in a thickness up to about 50 mils.

18. A composite as defined in claim 17, wherein the flame-resistance-conferring material is present on the substrate surface in a thickness of up to about 20 mils.

* * * * *